H. DULZ.
STOVE.
APPLICATION FILED JUNE 21, 1913.

1,113,760.

Patented Oct. 13, 1914.

WITNESSES:
W. K. Ford
James P. Barry

INVENTOR
Herman Dulz

BY
Whittemore Hulbert & Whittemore
ATTORNEYS

UNITED STATES PATENT OFFICE.

HERMAN DULZ, OF DETROIT, MICHIGAN, ASSIGNOR OF ONE-FOURTH TO CHARLES E. GRANT, OF DETROIT, MICHIGAN.

STOVE.

1,113,760.      Specification of Letters Patent.     Patented Oct. 13, 1914.

Application filed June 21, 1913. Serial No. 775,093.

*To all whom it may concern:*

Be it known that I, HERMAN DULZ, a citizen of the United States of America, residing at Detroit, in the county of Wayne and State of Michigan, have invented certain new and useful Improvements in Stoves, of which the following is a specification, reference being had therein to the accompanying drawings.

My invention relates to stoves of the type employing a gas burner for the heating medium, and has among the objects thereof to provide a device in which the gas will be automatically turned on when a receptacle is placed in operative relation to the burner; to provide such a device in which, upon the removing of the receptacle, the gas will be automatically turned off; to provide means for automatically igniting the gas when the receptacle is placed in operative relation to the burner; to provide a common actuating member for controlling both the supply of gas to the burner and the igniter; and further to provide a simple and efficient structure for accomplishing the objects hereinbefore mentioned.

Other objects of the invention will more fully hereinafter appear.

The invention consists in the novel construction, arrangement and combination of parts as herein set forth and particularly pointed out in the claims.

Figure 1:
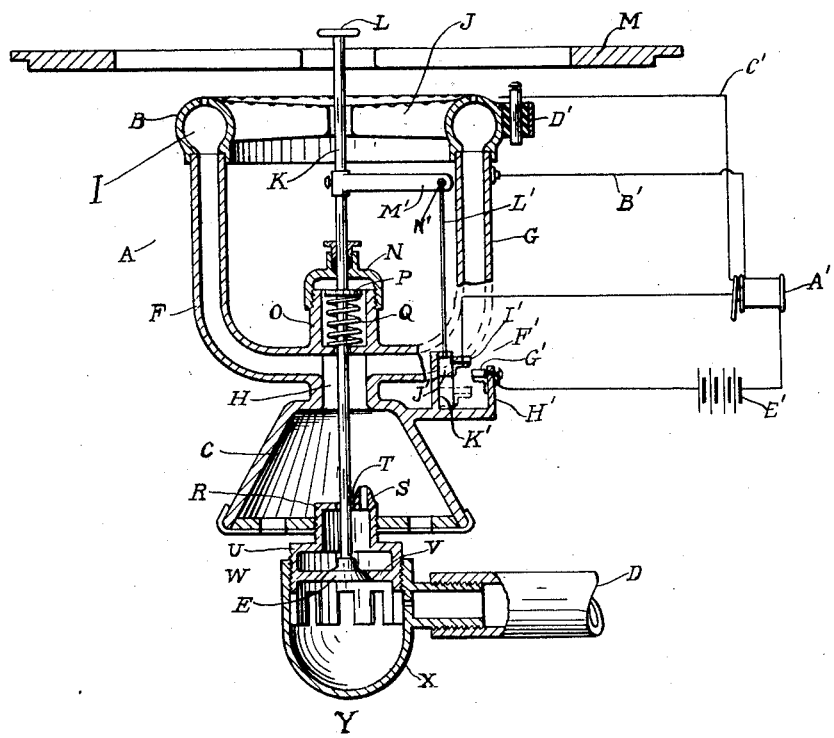
Figure 2:
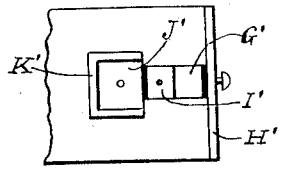

In the drawings, Figure 1 is a perspective view of the device embodying the invention; Fig. 2 is an enlarged top plan view of the switch which controls the igniter.

A designates the burner having an apertured top B, a mixing chamber C, and D is a gas supply pipe leading to the mixing chamber. The supply of gas to the mixing chamber is controlled by a valve E, and in order that this valve may be automatically opened when the receptacle is placed in operative relation to the apertured top, I provide an actuating device for the valve which is arranged to be operated to open the valve by a receptacle when the latter is positioned to be heated by the burner. Also means is provided for automatically turning on the igniter when the receptacle is arranged in operative relation to the burner.

Referring to the one embodiment of the invention shown in Figs. 1 and 2 of the drawings, the mixing chamber C and the apertured top B are connected together by means of spaced conduits F G communicating with an outlet H of the mixing chamber at their lower ends, and at their upper ends opening into the chamber I of the apertured top B. The latter is provided in the usual manner with a plurality of inwardly-extending apertured arms J. K is a rod having the upper end L thereof positioned to project slightly above the support M for the receptacle and having its lower end directly attached to the valve E in any suitable manner. This rod extends downwardly through a packing gland N that closes the outer end of the outlet H, and then centrally through the mixing chamber. O is an annular shoulder in the upper end of the portion H and P is a collar fixed upon the rod K. Interposed between the shoulder O and the collar P is a collar spring Q tending to raise the rod K so that the upper end L thereof will normally be above the support M. R is a discharge nozzle leading from the pipe D, S an aperture in the end of the nozzle forming the outlet for the gas, and T an opening through which the rod K passes. At the lower end of the nozzle R is a valve chamber U having a partition V provided with an aperture W which is controlled by the valve E. X is a fitting to which the conduit D is attached and which has a threaded engagement with the part U. Y are apertures through the sides of the chamber U so as to permit the gas from the conduit D to enter the valve chamber.

With the parts so far described the spring Q will normally retain the valve E closed. However, when the receptacle is placed upon the support M the bottom of the receptacle will contact with the upper end L of the rod and move the latter downward against the tension of the spring, opening the valve E and thereby admitting gas to the burner. The spring Q is of course, of a tension such as to permit even a light receptacle to move the rod K downward. As before stated, the burner has also associated therewith an igniter. Thus A' is a vibrator which has one lead as B' extending therefrom, electrically connected to the burner, and which has the other lead C' connected to a terminal D' attached to but insulated from the metal of the burner. This vibrator preferably receives its current from a storage battery E', one wire extending directly to the vibrator and the other wire extending from the battery to the vibrator but having a switch F' interposed therein. This switch comprises a fixed contact G' carried by a flange H' extending laterally from the mixing chamber, and a contact I' mounted upon a movable member J'. The latter engages a guide K' on the flange H' and is connected to a rod L' attached to an arm M' on the rod K. The connection between the member L' and K' may be of any suitable construction but as herein shown the rod L' has a hooked upper end which engages an eye N' in the arm M'. Thus whenever the rod K is depressed the arm M' will be carried with it and the contact member I' lowered so as to engage the contact G'. During the further downward movement of the rod K the member I' will pass out of engagement with the member G' so that when the valve E is completely opened the primary circuit will be broken. In other words, upon the opening of the valve the igniter is automatically and substantially simultaneously set into operation but when the valve reaches its open position, the circuit is again opened.

While I have shown and described a desirable form of the invention, I do not wish to limit my protection to the exact structure shown.

What I claim as my invention is:—

1. In a stove, the combination with an apertured top, a mixing chamber positioned below and spaced from said apertured top, an outlet at the upper end of said mixing chamber, a plurality of spaced conduits connecting said outlet with the apertured top, a valve chamber positioned below said mixing chamber, a valve in said chamber controlling the passage of gas from the valve chamber into the mixing chamber, a depressible rod for operating said valve extending up through said mixing chamber, the upper end of said rod projecting above said apertured top, a housing above said outlet and through which said rod extends, a collar fixed on said rod, a spring arranged in said housing and acting upon said collar to hold the valve to its seat, and a cap closing said housing.

2. In a stove, the combination of an apertured top, a mixing chamber positioned below and spaced from said apertured top, a connection between the mixing chamber and the apertured top, a valve chamber positioned below said mixing chamber, a valve in said chamber controlling the passage of gas from said valve chamber into the mixing chamber, a depressible rod for operating said valve extending up through said mixing chamber and having the upper end thereof projecting above the apertured top, a laterally-extending arm carried by said rod, a projection on the mixing chamber, an igniter comprising a contact fixed to said projection, a coöperating contact, a movable member carrying said coöperating contact, guides on said projection for said movable member, a connection on said movable member and said arm, an electrical igniter for the burner, electrical connections for said igniter, and a switch for controlling said connections.

In testimony whereof I affix my signature in presence of two witnesses.

HERMAN DULZ.

Witnesses:
WM. J. BELKNAP,
CHAS. GRANT.

---

Copies of this patent may be obtained for five cents each, by addressing the "Commissioner of Patents, Washington, D. C."